(12) United States Patent
Kerr

(10) Patent No.: US 7,677,638 B1
(45) Date of Patent: Mar. 16, 2010

(54) CAR AND WINDOW SHIELD DEVICE

(76) Inventor: Godfrey Wayne Kerr, 18533 NW. 53rd Ave., Miami, FL (US) 33055

( * ) Notice: Subject to any disclaimer, the term of this patent is extended or adjusted under 35 U.S.C. 154(b) by 0 days.

(21) Appl. No.: 12/407,724

(22) Filed: Mar. 19, 2009

(51) Int. Cl.
 *B60J 7/20* (2006.01)
(52) U.S. Cl. .............................. 296/136.07; 296/136.01; 296/136.1
(58) Field of Classification Search ............ 296/136.01, 296/136.04, 136.07, 136.1, 136.13; 135/88.01, 135/88.03, 88.05, 88.07; 160/238
See application file for complete search history.

(56) References Cited

U.S. PATENT DOCUMENTS

| | | | |
|---|---|---|---|
| RE29,264 E | * | 6/1977 | Woodward ............... 135/88.16 |
| 4,139,233 A | | 2/1979 | Bott |
| 4,726,149 A | | 2/1988 | Tryba |
| 4,998,768 A | | 3/1991 | Wu |
| 5,209,545 A | | 5/1993 | Slaugh |
| D350,322 S | | 9/1994 | Carson et al. |
| 5,594,193 A | * | 1/1997 | Sheridan .................... 89/36.08 |
| 5,915,399 A | * | 6/1999 | Yang ....................... 135/88.01 |
| D468,256 S | | 1/2003 | Wright |
| 7,093,878 B1 | | 8/2006 | Fontanilla |
| 2005/0098080 A1 | | 5/2005 | Pritchett |

* cited by examiner

*Primary Examiner*—Lori L Lyjak

(57) ABSTRACT

A car covering for covering and protecting a car and the windows from elements and harsh weather comprising an outer shell having the shape of a vehicle; a set of window coverings removably attached to the outer shell via a set of fastening devices, wherein the set of fastening devices can be detached to allow a set of rigid plate members to be inserted into said window coverings, wherein when the set of rigid plate members are inserted into said window coverings the set of rigid plate members are sandwiched between the respective window coverings and the outer shell, the outer shell comprising a foam layer.

1 Claim, 3 Drawing Sheets

CAR AND WINDOW SHIELD DEVICE

FIELD OF THE INVENTION

The present invention is directed to a car and window covering for covering and protecting a car and car windows including a car cover, a set of window covers, and a set of protection inserts to allow a person to protect a car and car windows from outside elements and harsh weather.

BACKGROUND OF THE INVENTION

An object of this invention is to provide a car and window covering that will protect the car and the windows from outside elements. Another object of this invention is to protect the car and windows from harsh weather and larger objects and to protect the windows from cracking by installing rigid plates into the window portions of the car cover.

SUMMARY OF THE INVENTION

The present invention relates to a car cover. The car cover comprises an outer shell having the shape of a vehicle. The outer shell further comprises a set of window coverings, said window coverings line up with a set of windows on said vehicle, said window coverings are attached to said outer shell by a set of fastening devices outlining said window coverings, said set of fastening devices can be detached to allow a set of rigid plate members to be inserted into said window coverings to protect said set of windows from harsh outer elements, said set of fastening devices can be attached to said out shell to secure said set of rigid plate members within said window coverings.

DESCRIPTION OF PREFERRED EMBODIMENTS

Figure 1:
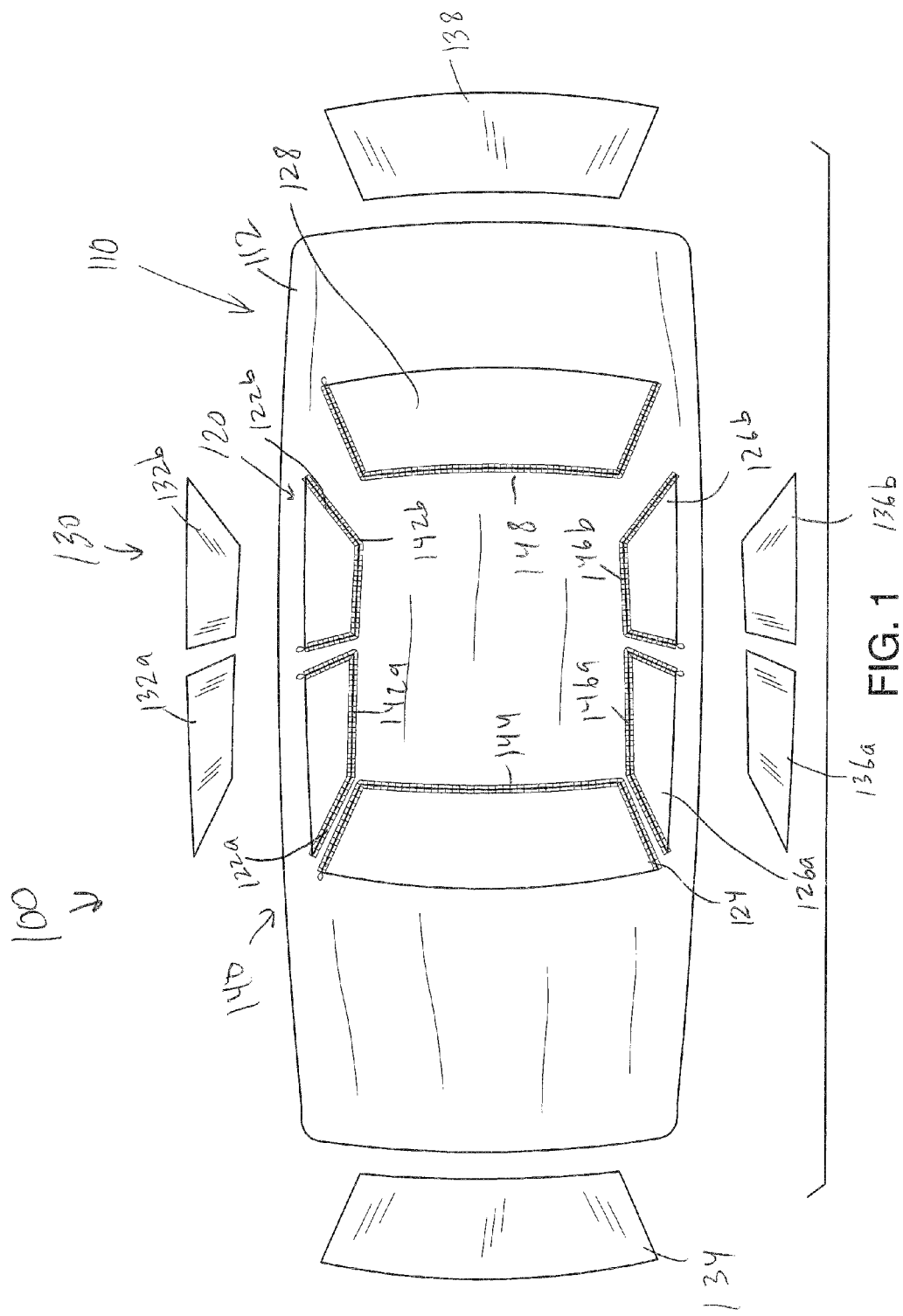
FIG. 1 is an illustration of a car cover according to the invention including a car cover apparatus, a set of window covers, and a set of removeable plates.

Referring now to FIG. 1, car cover 100 comprises car cover apparatus 110, set of window coverings 120, set of plates 130, and fastening means 140. In the illustrated embodiment of FIG. 1, car cover apparatus 110 comprises outer shell 112. In the illustrated embodiment of FIG. 1, set of window coverings 120 comprises window covering 122a, window covering 122b, window covering 124, window covering 126a, window covering 126b, and window covering 128. In the illustrated embodiment of FIG. 1, set of plates 130 comprises plate 132a, plate 132b, plate 134, plate 136a, plate 136b, and plate 138. In the illustrated embodiment of FIG. 1, fastening means 140 comprises fastener 142a, fastener 142b, fastener 144, fastener 146a, fastener 146b, and fastener 148. In the illustrated embodiment of FIG. 1, car cover apparatus 110 is placed over the outside of a vehicle. In the illustrated embodiment of FIG. 1, window coverings 120 match and line up with the window of the vehicle that car cover apparatus 110 is placed over. In the illustrated embodiment of FIG. 1, set of plates 130 correspond to set of window coverings 120. A person can open up set of window coverings 120 by opening fastening means 140. In the illustrated embodiment of FIG. 1, a person can open fastener 142a, pull back window covering 122a, insert plate 132a, and close fastener 142a. In the illustrated embodiment of FIG. 1, a person can insert set of plates 130 into set of window coverings 120 for the corresponding set of plate 130.

In the illustrated embodiment of FIG. 1, set of plates 130 provide strength to the windows of a vehicle when harsh weather conditions exist, i.e., hail. Examples of fasteners that can be used in accordance with the present invention include zippers and hook-and-loop.

In certain embodiments, car cover apparatus 110 comprises outer shell 112. In certain embodiments, outer shell 112 comprises a waterproof material. In certain embodiments, car cover apparatus 110 comprises foam layer 312 (see FIG. 3). Foam layer 312 provides strength to the outer surface of the vehicle and windows when harsh weather conditions exist, i.e., hail. In certain embodiments, fastening means 140 comprises standard fasteners, such as hook and loop fasteners, snap button, buttons, and the like. In certain embodiments, set of plates 130 comprise a rigid material selected from the group consisting of metal, plastic, wood, and combinations thereof. In certain embodiments, set of window coverings 120 comprise forms and shapes that correspond to the forms and shapes of the vehicle window. In certain embodiments, set of plates 130 comprise forms and shapes that correspond to the forms and shapes of set of window coverings 120.

Figure 2:
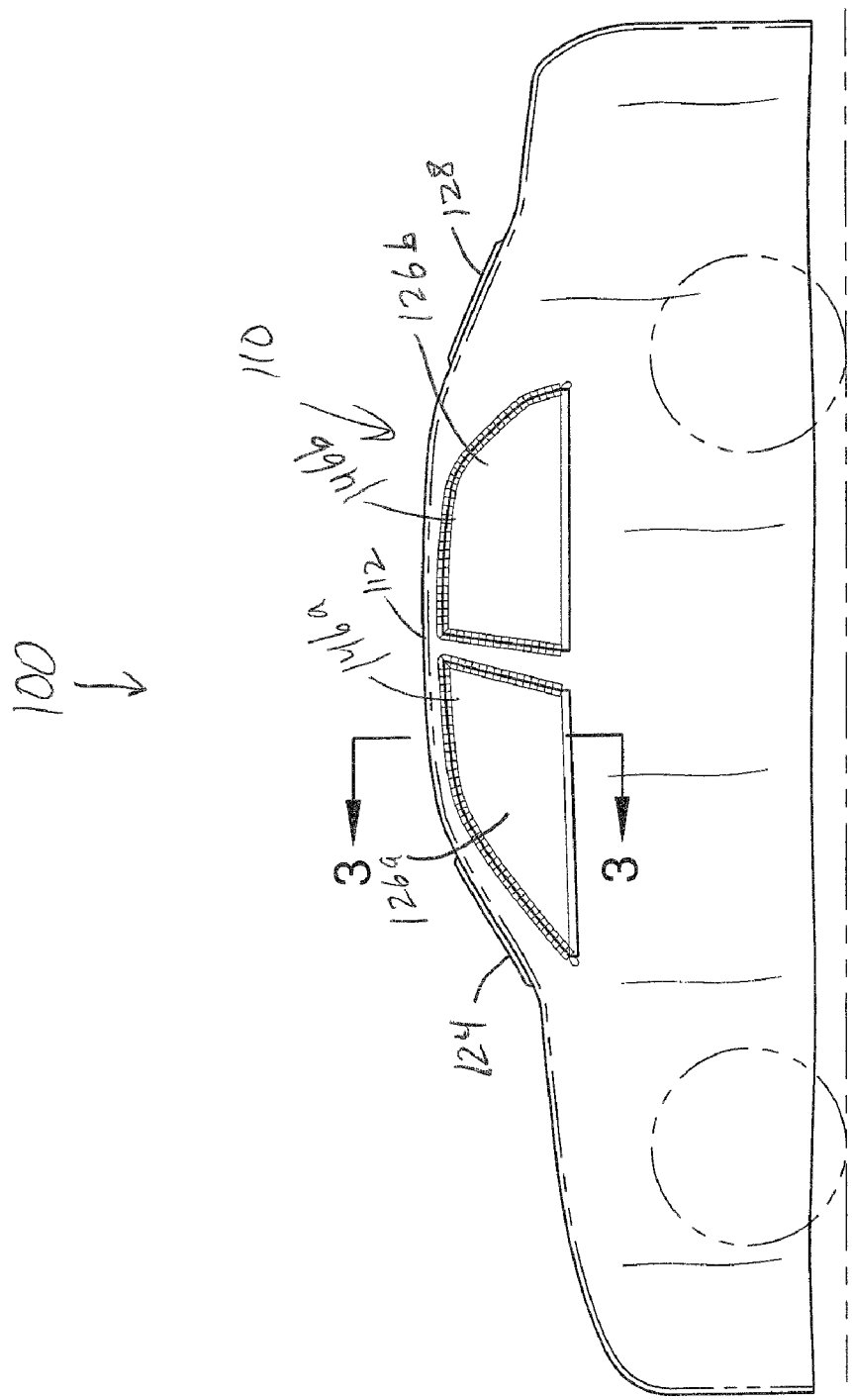
FIG. 2 is a side view illustration of the car cover of FIG. 1, as shown on a car.

Referring now to FIG. 2, a side view of car cover 100 is shown as used on a vehicle. In the illustrated embodiment of FIG. 2, window covering 124, window covering 126a, window covering 126b, window covering 128 are shown as used on a vehicle. A person can open fastener 146a and fastener 146b and insert plate 136a and plate 136b into window covering 126a and window covering 126b. The person can then close fastener 146a and fastener 146b to contain plate 136a and plate 136b.

Figure 3:
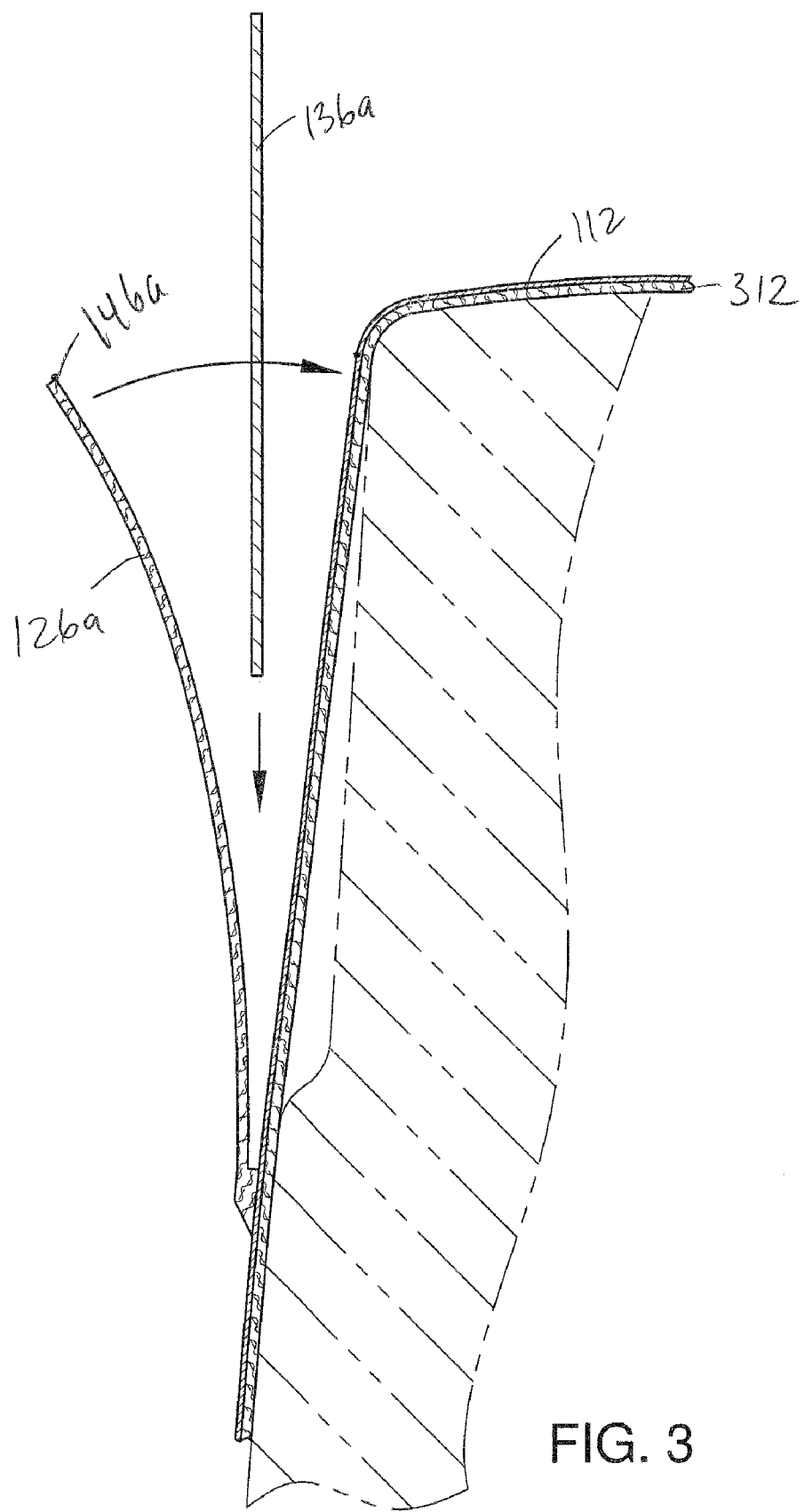
FIG. 3 is a cross section view of a window cover of FIG. 1.

Referring now to FIG. 3, a cross section view of window covering 126a is shown in an open position. In the illustrated embodiment of FIG. 3, car cover 110 is shown comprising outer shell 112 and foam layer 312. In the illustrated embodiment of FIG. 3, a person can open window covering 126a by opening fastener 146a and inserting plate 136a into the open slot. A person can then close fastener 146a and contain plate 136a.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A car cover comprising:
   an outer shell having the shape of a vehicle, said outer shell comprising a set of window coverings, said window coverings line up with a set of windows on said vehicle, said window coverings are attached to said outer shell by a set of fastening devices outlining said window coverings, said set of fastening devices can be detached to allow a set of rigid plate members to be inserted into said window coverings then subsequently reattached to secure said set of rigid plate members within said window coverings wherein when the rigid plate members are inserted into said window coverings the rigid plate members are sandwiched between the respective window coverings and the outer shell, the outer shell comprising a foam layer.

* * * * *